Nov. 10, 1931.    L. S. BRESSLER    1,831,478
DOUGH RAISING CHAMBER
Filed Aug. 29, 1928    3 Sheets-Sheet 1
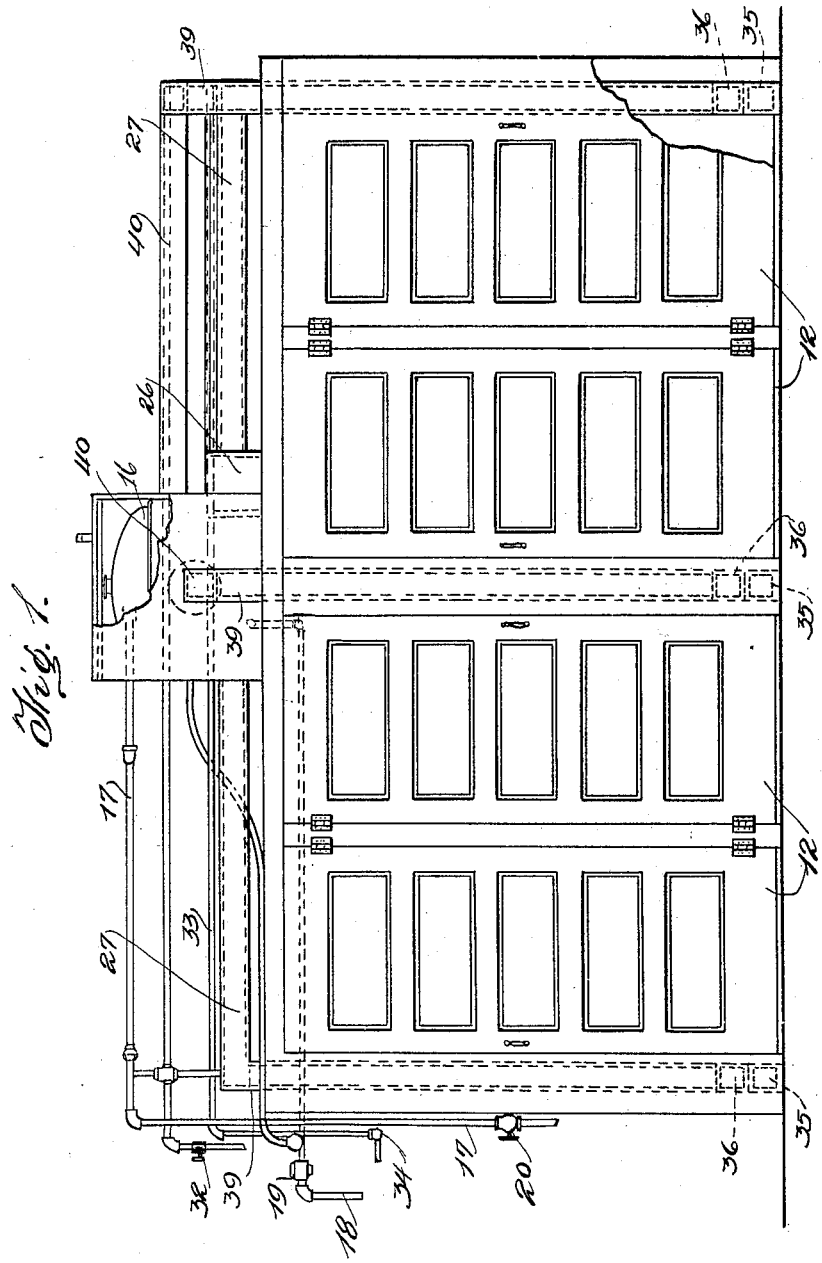
INVENTOR.
L. S. Bressler
BY
ATTORNEY.

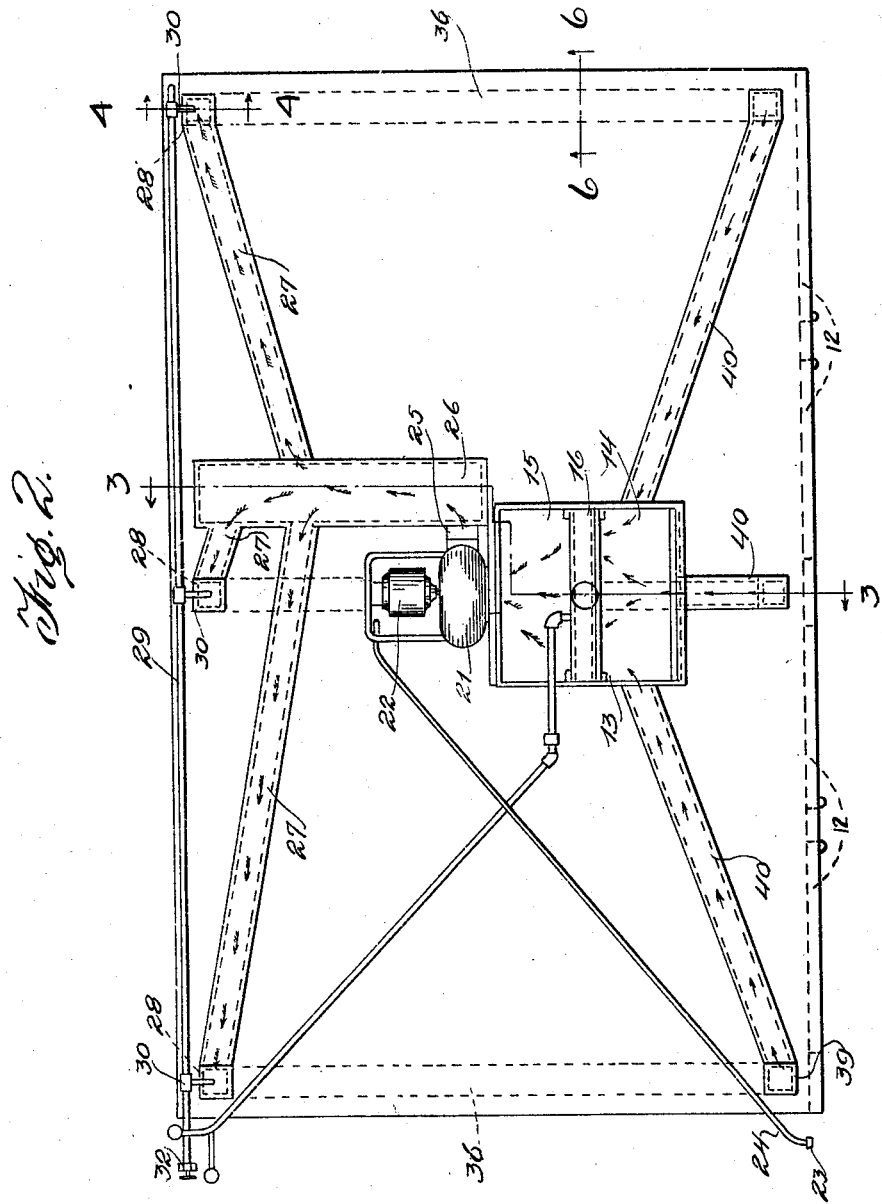

Nov. 10, 1931.    L. S. BRESSLER    1,831,478
DOUGH RAISING CHAMBER
Filed Aug. 29, 1928    3 Sheets-Sheet 3
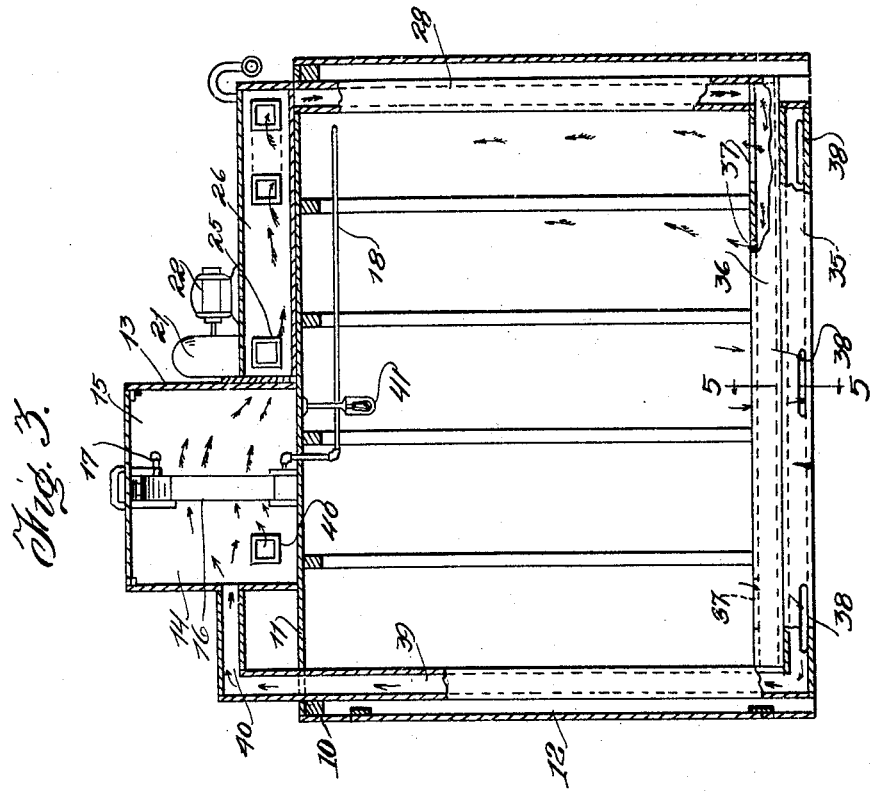
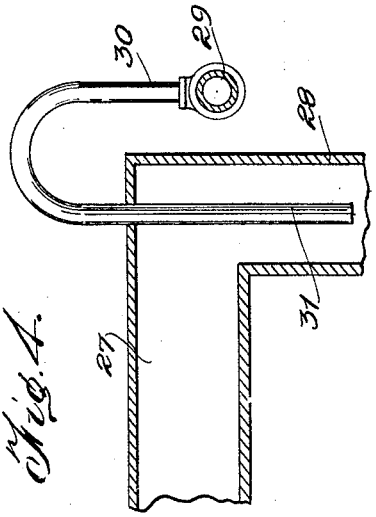
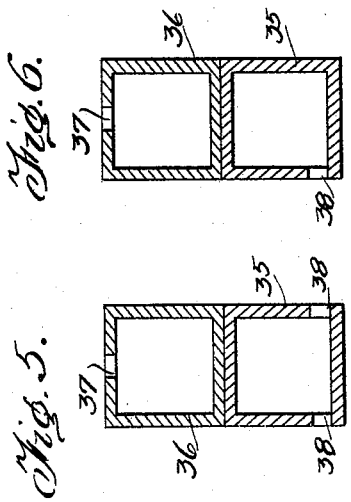
INVENTOR.
L. S. Bressler
BY
ATTORNEY.

Patented Nov. 10, 1931

1,831,478

UNITED STATES PATENT OFFICE

LOUIS S. BRESSLER, OF CHICAGO, ILLINOIS

DOUGH RAISING CHAMBER

Application filed August 29, 1928. Serial No. 302,672.

This invention relates to the art of baking and has special reference to a dough raising chamber.

One important object of the invention is to provide an improved dough raising chamber wherein the dough may be placed for raising, the chamber being provided with novel arrangements for maintaining proper temperature and moisture conditions therein.

A second important object of the invention is to provide an improved apparatus of this character wherein a constant circulation of moist air is maintained through the chamber by novel means.

A third important object of the invention is to provide an improved apparatus of this character wherein the air circulation means is so arranged that heated air is introduced at a point closely adjacent the bottom of the chamber while cold air is drawn off just below the points of introduction of the heated air so that all of the air in the chamber is maintained in circulation.

A fourth important object of the invention is to provide a novel arrangement of such apparatus wherein wet steam can be introduced into heated air prior to the passage of such air into the chamber.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front elevation partly in section of a chamber constructed in accordance with this invention.

Figure 2 is a top plan view of such a chamber with the roof of the air heating compartment removed.

Figure 3 is a section on the line 3—3 of Figure 2.

Figure 4 is an enlarged detail section on the line 4—4 of Figure 2.

Figure 5 is an enlarged detail section on the line 5—5 of Figure 3.

Figure 6 is an enlarged detail section through the horizontal portions of the inlet and exhaust conduits on the line 6—6 of Figure 2.

In carrying out this invention there is provided a main chamber having vertical walls 10 and a top 11. In one of these vertical walls is formed a series of doorways normally closed by doors 12. It is to be noted that this chamber may be in the form of a room in a building or may be built in within such a room as is most convenient in construction and it is also to be noted that the chamber may be built of any suitable size in accordance with the quantity of dough which is subjected to the raising operation at one time. On the roof 11 is located an air heating compartment 13 having an inlet side 14 and an outlet side 15. Between these two sides is mounted a radiator 16 which is preferably of the automotive type, steam being used instead of water in the radiator to heat the air passing therethrough. This steam is supplied through a steam supply pipe 17 and is drawn off through an exhaust pipe 18 having a suitable trap 19 therein. Pipe 17 is provided with a regulating valve 20 so that the amount of steam flowing through the radiator may be regulated. Connected to the outlet side 15 of the compartment 13 is the intake of a blower or fan 21 driven by a motor 22 controlled through a switch 23 on the feed cable 24. The outlet or exhaust 25 of the fan 21 opens into a header 26 from which branch the hot air conduits or pipes 27, two of these pipes leading to the rear corners of the rooms and the third leading to the rear central portion thereof. At the extremities of their horizontal portions the pipes 27 extend downwardly as at 28, there thus being a vertical hot air pipe within the room in each corner and centrally of the rear portion. Extending along the rear of the apparatus is a steam supply pipe 29 from which rises goose-necks 30 having ends 31 which extend downwardly and open into the vertical pipe portions 28. A valve 32 controls the flow of steam through this pipe and a steam return pipe 33 leads back from these conduits or hot air pipes and is provided with a trap 34.

By this means the proper quantity of wet steam may be introduced into the chamber.

Centrally and at each end of the chamber there extends from front to back thereof an exhaust or conduit 35 and on top of each of these exhaust pipes extends the horizontal portion 36 of the hot air pipe or conduit 28 in the respective position so that the hot air flows down these conduits 28 and into the horizontal portions 36, escaping through slots 37 in the top of these horizontal portions. The horizontal portions 35 of the exhaust pipes are provided at their lower side walls with intake slots 38. Extending from each of the pipes 35 upwardly is the vertical portion 39 of the exhaust pipe and this portion passes through the roof 11 and is connected to the intake side 14 of the heating compartment by a horizontal pipe 40.

A suitable lighting arrangement indicated by the lamp 41 is preferably provided in the chamber and it is to be understood that this chamber may either be equipped with permanent or removable shelfing or that the dough may be run in through the doors 12 on suitable trucks. The arrangement of such shelfing and trucks is not here illustrated as the same forms no specific part of the invention.

It will now be seen that the operation of the fan 21 will cause circulation of the air in the direction of the arrows, the feathered arrows indicating the flow of hot air while the unfeathered arrows indicate the return of the cooled air. Thus the hot air rises from the slots 37, passes upward in the chamber to the top and then downward to the bottom where it enters the exhaust pipes through the slots 38. During the passage of the air from one side to the other of the heating compartment 13 it is heated and as it enters the vertical pipes 28 it is moistened by the steam, the flow of the steam being in such direction that condensation is not affected as would be the case were the flow opposite the air current.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In dough raising apparatus, a dough chamber, a heating compartment having inlet and outlet ends, a reticulated heater interposed between said ends, hot air conduits leading from the outlet end of the heating compartment to the dough chamber, exhaust conduits leading from the dough chamber, means to maintain the air in circulation, and pipes for wet steam communicating with the hot air conduits, said conduits extending across the bottom of the dough chamber with the hot air conduits resting on the exhaust conduits and having escape slots in its top, the portions of the exhaust conduits thus extending having intake slots in their sides.

2. In dough raising apparatus, a dough chamber, a heating compartment having inlet and outlet ends, a reticulated heater interposed between said ends, hot air conduits leading from the outlet end to the dough chamber, exhaust conduits leading from the dough chamber to the inlet end of the heating compartment, means to maintain the air in circulation, and steam pipes for wet steam communicating with the hot air conduits, said conduits extending across the bottom of the dough chamber with the hot air conduits resting on the exhaust conduits and having escape slots in its top, the portions of the exhaust conduits thus extending having intake slots in their sides.

3. In dough raising apparatus, a dough chamber, a heating compartment having inlet and outlet ends, a reticulated heater interposed between said ends, hot air conduits leading from the outlet end of the heating compartment to the dough chamber, exhaust conduits leading from the dough chamber, means to maintain the air in circulation, and pipes for wet steam communicating with the hot air conduits, said conduits extending vertically from the top of the dough chamber downwardly therein and then across the bottom of the dough chamber with the hot air conduits resting on the exhaust conduits and having escape slots in its top, the portions of the exhaust conduits thus extending having intake slots in their sides, said steam pipes leading downwardly into the vertical portions of the hot air conduits at the tops thereof.

4. In dough raising apparatus, a dough chamber, a heating compartment having inlet and outlet ends, a reticulated heater interposed between said ends, hot air conduits leading from the outlet end to the dough chamber, exhaust conduits leading from the dough chamber to the inlet end of the heating compartment, means to maintain the air in circulation, and steam pipes for wet steam communicating with the hot air conduits, said conduits extending vertically from the top of the dough chamber downwardly therein and then across the bottom of the dough chamber with the hot air conduits resting on the exhaust conduits and having escape slots in its top, the portions of the exhaust conduits thus extending having intake slots in their sides, said steam pipes leading downwardly into the vertical portions of the hot air conduits at the tops thereof.

In testimony whereof I affix my signature.

LOUIS S. BRESSLER.